United States Patent
Cooper (10) Patent No.: US 9,541,987 B2
(45) Date of Patent: Jan. 10, 2017

(54) GENERIC HOST-BASED CONTROLLER LATENCY METHOD AND APPARTUS

(71) Applicant: Intel Corporation, Santa Clara, CA (US)

(72) Inventor: Barnes Cooper, Tigard, OR (US)

(73) Assignee: Intel Corporation, Santa Clara, CA (US)

(*) Notice: Subject to any disclaimer, the term of this patent is extended or adjusted under 35 U.S.C. 154(b) by 350 days.

(21) Appl. No.: 13/931,807

(22) Filed: Jun. 28, 2013

(65) Prior Publication Data

US 2015/0006931 A1 Jan. 1, 2015

(51) Int. Cl.
*G06F 1/32* (2006.01)

(52) U.S. Cl.
CPC ........... *G06F 1/3268* (2013.01); *G06F 1/3203* (2013.01); *G06F 1/3275* (2013.01); *Y02B 60/1225* (2013.01); *Y02B 60/1228* (2013.01); *Y02B 60/1246* (2013.01)

(58) Field of Classification Search
CPC .............................. G06F 1/3203; G06F 1/3268
USPC ......................................................... 713/323
See application file for complete search history.

(56) References Cited

U.S. PATENT DOCUMENTS

| | | | |
|---|---|---|---|
| 2005/0094674 A1 | 5/2005 | Zinke et al. | |
| 2005/0160254 A1 | 7/2005 | Lin et al. | |
| 2006/0206737 A1 | 9/2006 | Lee | |
| 2009/0249103 A1* | 10/2009 | Jeyaseelan et al. | 713/324 |
| 2009/0327774 A1* | 12/2009 | Jeyaseelan et al. | 713/320 |
| 2010/0167513 A1 | 7/2010 | Blatchford | |
| 2010/0169522 A1* | 7/2010 | Fleming | G06F 13/385 710/100 |
| 2010/0169685 A1* | 7/2010 | Gough | G06F 1/3215 713/323 |
| 2012/0198248 A1 | 8/2012 | Jeyaseelan et al. | |
| 2012/0324265 A1 | 12/2012 | Jeyaseelan et al. | |
| 2013/0132755 A1 | 5/2013 | Cooper et al. | |

FOREIGN PATENT DOCUMENTS

| | | |
|---|---|---|
| JP | 2010-9581 A | 1/2010 |
| TW | 200306721 A1 | 11/2003 |
| TW | 201516592 A | 5/2015 |
| WO | 2014/210258 A1 | 12/2014 |

OTHER PUBLICATIONS

International Search Report and Written Opinion received for International Application No. PCT/US2014/044250, mailed on Oct. 27, 2014.

(Continued)

*Primary Examiner* — Albert Wang
(74) *Attorney, Agent, or Firm* — Alpine Technology Law Group LLC (57) ABSTRACT

Methods and apparatus relating to generic host-based controller latency are described. In one embodiment, latency information, corresponding to one or more devices, is detected from a host controller that controls access to the one or more devices. Detection of the latency information is performed in response to one or more transactions that are initiated by the host controller. Other embodiments are also claimed and disclosed.

26 Claims, 6 Drawing Sheets

(56) References Cited

OTHER PUBLICATIONS

Office Action and Search Report received for Taiwanese Patent Application No. 103119566, mailed on Jan. 12, 2016, 15 pages including 8 pages of English translation.
International Preliminary Report on Patentablity received for International Application No. PCT/US2014/044250, mailed on Jan. 7, 2016, 8 pages.
Office Action received for Korean Patent Application No. 10-2015-7032742, mailed on Aug. 23, 2016, 6 pages including 1 page of English translation.
Notice of Allowance received for Korean Patent Application No. 10-2015-7032742, mailed on Nov. 8, 2016, 2 pages of notice of allowance and 4 pages of allowed claims in English.

* cited by examiner

GENERIC HOST-BASED CONTROLLER LATENCY METHOD AND APPARTUS

FIELD

The present disclosure generally relates to the field of electronics. More particularly, some embodiments relate to generic host-based controller latency method and apparatus.

BACKGROUND

As mobile computing devices become more common place, one major goal of system designers is to reduce power consumption, e.g., to allow for longer battery life, less heat generation, etc. However, when it comes to power consumption reduction in various components of a computer system, system designers have to generally rely on information obtained from predefined standards that govern timing of operations for such components to ensure correctness. Accordingly, whether or not a component is capable of entering a lower power consumption state and still maintain correctness may directly depend on whether a standard (e.g., relating to timing requirements) has already been predefined for that component.

Furthermore, while energy efficiency is important for today's small form factor mobile computing devices, energy efficiency is also important for larger systems, in part, as higher power consumption may increase heat generation. Excessive heat may damage components of a computer system. Further, the higher power utilization may increase battery consumption, e.g., in mobile computing devices, which in turn reduces the amount of time a mobile device may be operated prior to recharging. The additional power consumption may additionally require usage of larger batteries that may weigh more. Heavier batteries reduce the portability or usability of a mobile computing device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide for determination of latency information (for one or more devices in a computing system) via generic host-based controller latency reporting. To ensure correct operation, certain latency requirements need to be met. These latency requirements generally differ from one device to another. Moreover, some implementations rely on predefined standards to determine device latency information. However, such a predefined standard may not always exist for all devices or some devices may be able to operate beyond the standard requirements. To this end, an embodiment utilizes logic to detect latency information, corresponding to one or more devices, from a host controller that is to control access to the one or more devices. The logic may detect the latency information in response to one or more transactions that are initiated by the host controller.

As discussed herein, a "host controller" generally refers to logic (e.g., controller 161 of FIG. 1) that controls/gates access to one or more devices (e.g., devices 162 of FIG. 1) by components of a computing system (such as the computing systems discussed with reference to FIGS. 1 and 4-6). Additionally, as discussed herein, "latency information" generally refers to the amount of delay a device or host controller may tolerate from when it requests to move data or messages until the system grants the request. In some cases (e.g., a networking device), this may be a function of connection speed and internal buffering, or in the case of other devices (e.g., storage), it may simply be a performance-constraint based on how utilized the device is and/or how recently it has been used. The sleep latency value(s) may be progressively cycled through to determine deeper and deeper latency values, e.g., for as long as the host controller(s) remain inactive/idle. The latency information is reported to one or more entities (as will be further discussed herein), e.g., to allow for more flexibility to trade off performance vs. power consumption reduction/energy efficiency.

In some embodiments, at least some of the power consumption states discussed herein may be in accordance with or similar to those defined under Advanced Configuration and Power Interface (ACPI) specification, Revision 5, December 2011. For example, L0 may generally refer to the normal operation mode, L1 may refer to a sleep mode, L2 may refer to a deeper sleep mode, and so on.

Figure 1:
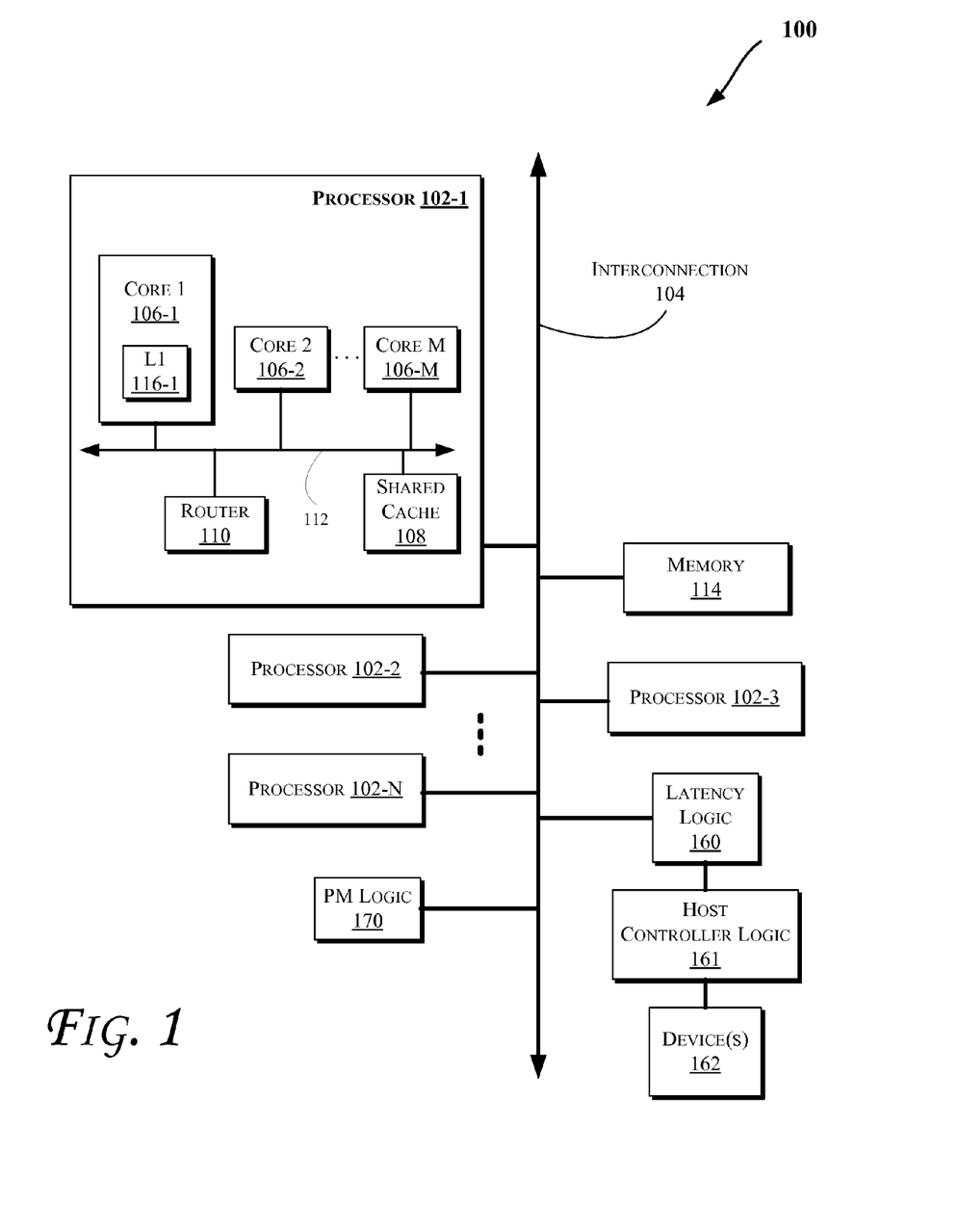
FIGS. 1 and 4-6 illustrate block diagrams of embodiments of computing systems, which may be utilized to implement various embodiments discussed herein.

The techniques discussed herein may be used in any type of a computing system with power consumption settings, such as the systems discussed with reference to FIGS. 1 and 4-6 (which may include smart phones, tablets, laptop computers, UMPC (Ultra-Mobile Personal Computer), Ultrabooks, etc.). More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, logic 160 detects latency information (regarding one or more devices 162) from host controller(s) 161 (e.g., in a progressive fashion as will be further discussed with reference to FIGS. 2-4). Logic 160 conveys the detected latency information to other components of the system such as a Power Management (PM) logic 170, Operating System (OS), device driver(s), software application(s), etc. in order to maintain operational correctness by adhering to the latency requirements that are determined based on the detected latency information. For example, logic 160 may allow for dynamic adjustment of latency information for individual devices (e.g., whether or not a predefined standard exists). Furthermore, power consumption control may be achieved (e.g., by logic 160) based, at least in part, on latency information obtained from the PM logic 170, OS, device driver(s), and/or software application(s) (e.g., where the OS and/or software application(s), and/or device driver(s) may be stored in the memory 114). In an embodiment, latency information is provided by a host controller (such as logic 161) and latency information transactions are not initiated directly by a device (such as device(s) 162) but rather through the device's host controller. Also, device(s) may include any of the components discussed with reference to FIGS. 1-6, including for example eMMC (embedded MultiMedia Card), Serial Advanced Technology Attachment (SATA), and/or UFS (Universal Flash Storage) storage devices. Furthermore, logic 160 and/or 170 may be provided in other locations than those shown in FIG. 1 (e.g., within cores 106, directly coupled to the interconnection 104, etc.).

Figure 2:
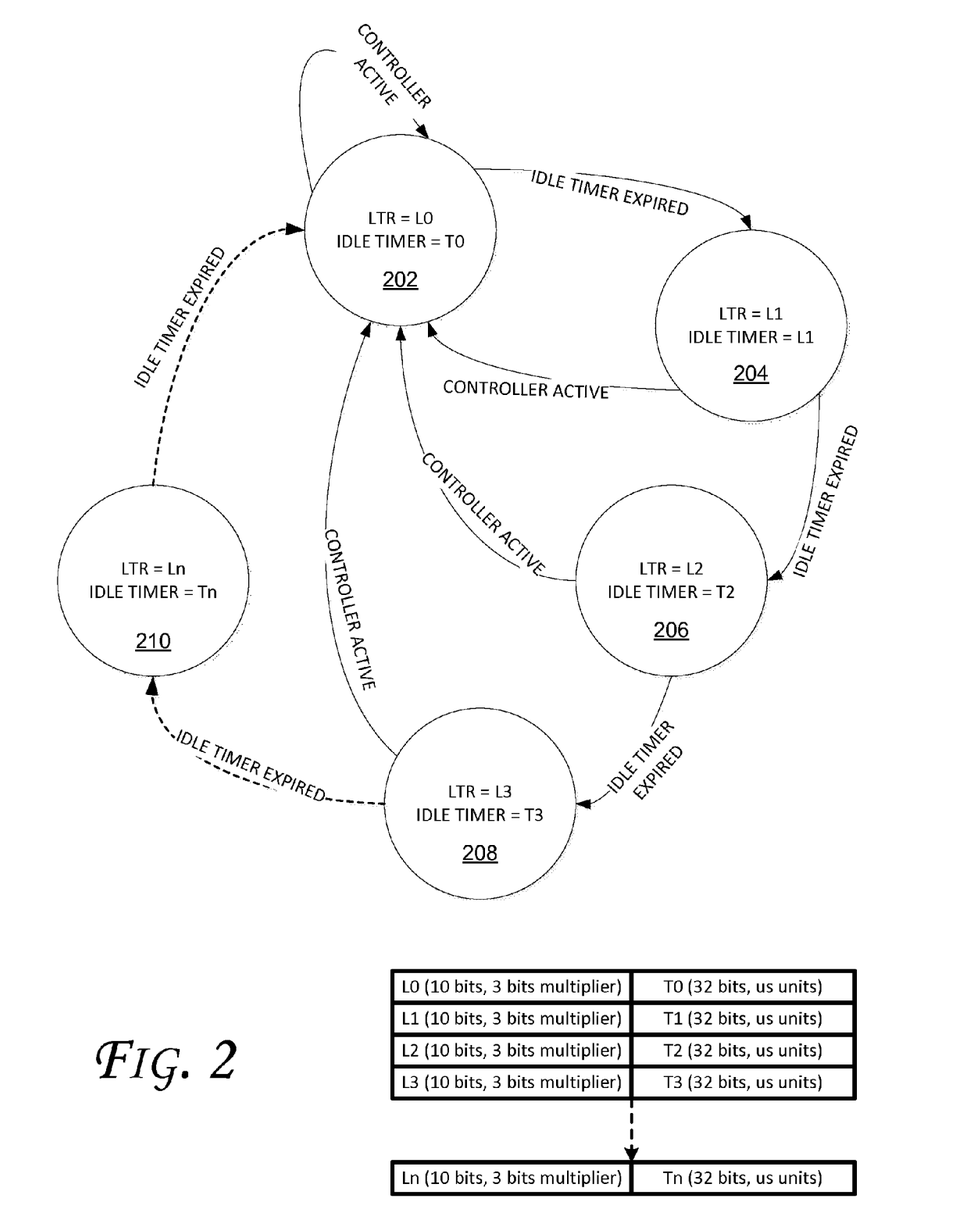
FIG. 2 illustrates a state diagram for logic to implement progressive latency reporting, in accordance with an embodiment.

FIG. 2 illustrates a state diagram to implement progressive latency reporting, in accordance with an embodiment. In an embodiment, logic 160 of FIG. 1 operates in accordance with the state diagram of FIG. 2. As shown, logic 160 tracks idle time in device controller(s) 161, and progressively cycles through deeper and deeper latency values that are reported (e.g., to the Power Management (PM) logic 170 in the platform) as long as the host controller(s) 161 remain inactive/idle. As the host controller(s) 161 idles longer, the latency values may be software provided (e.g., by a silicon vendor, system developer, a user, etc.) to more flexibly make a tradeoff between energy efficiency and performance.

Generally, LTR (Latency Tolerance Reporting) is used to allow for reporting of service latency requirements for one or more end devices (such as device(s) 162) that are coupled via a host controller (e.g., controller(s) 161). This in turn allows for power management (e.g., via PM logic 170) without impacting functionality and/or performance. Also, even though FIG. 2 shows usage of LTR values (which may be associate with Peripheral Component Interconnect express (PCIe)), the embodiments may also be applied in accordance with other explicit latency reporting mechanisms such as Latency Tolerance Messaging (LTM) mechanism supported by Universal Serial Bus (USB) 3.0 (e.g., in accordance with USB 3.0 Specification, released in November 2008) or through implicit means such as Link Power Management (LPM) mechanism supported by USB 2.0 (e.g., in accordance with USB 2.0 Link Power Management Addendum Engineering Change Notice to the USB 2.0 Specification as of Jul. 16, 2007, and Errata for USB 2.0 ECN: Link Power Management (LPM)—July 2007 as of Oct. 11, 2011), Serial Advanced Technology Attachment (SATA) link state(s), etc. An alternate approach includes having a devices driver write to chipset proprietary registers (e.g., SDIO (Serial Data Input/Output) registers). Furthermore, some embodiments may be applied to eMMC, SATA, and/or UFS storage devices.

Referring to FIG. 2, a move from stage 202 (with LTR at L0 and an idle timer set to T0—noting that the table at the bottom of FIG. 2 shows some sample T and L values, according to some embodiments) to stage 204 is made once the idle timer (set to T0) expires. At stage 204, LTR is set to L1 and idle timer is set to L1. If the controller (e.g., host controller 161) becomes active, then stage 202 is entered. If the controller remains inactive at stage 204, once the idle timer (set to L1) expires, stage 206 is entered. This process repeats for stages 206-210 as shown in FIG. 2 in accordance with the values shown at the bottom of FIG. 2 in table format. In one embodiment, the illustrated timing values have a multiplier that selects the unit of time (e.g., 000b=microseconds, 001b=milliseconds, 010=hundreds of milliseconds, 011=seconds) and a value (e.g., 10 bits). The latency value is programmed as 32 bits in microsecond units and does not have a multiplier. Hence, the latency values are progressively increased (by progressing through stages 202-210 successively) as the host controller remains inactive, thereby allowing for increasingly deeper sleep states to be achieved and/or providing flexibility such that software is allowed to provide the latency values (e.g., from a silicon vendor, system developer, a user, etc.) to more flexibly make a tradeoff between energy efficiency and performance.

Figure 3:
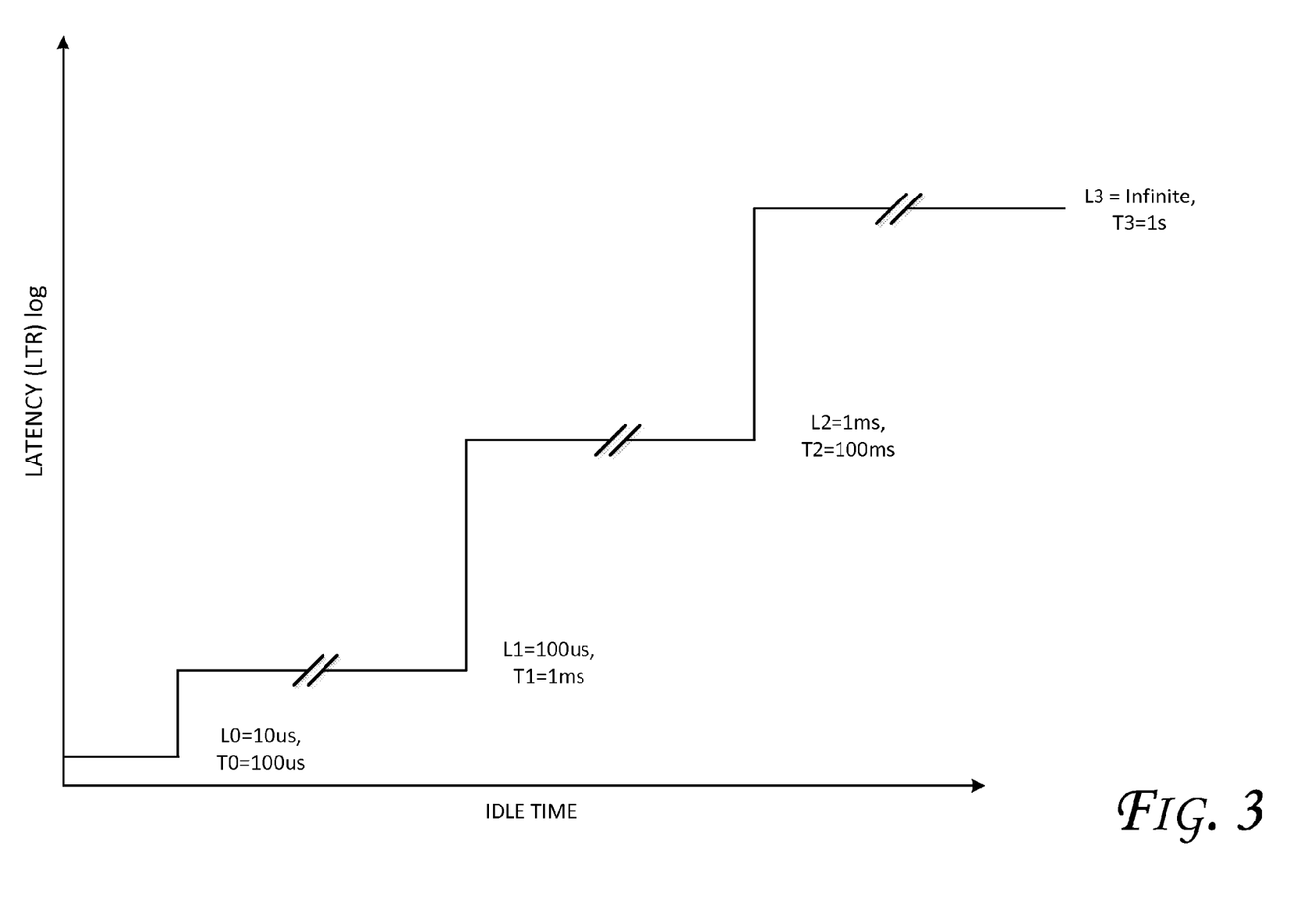
FIG. 3 illustrates a graph of latency information provision as a function of controller idle time, according to an embodiment.

FIG. 3 illustrates a graph of latency information provision as a function of controller idle time, according to an embodiment. As shown, as the idle time value increases (e.g., in the four progressive steps from T0 to T3), the Lx values increase to indicate higher latency (e.g., LTR) values. Accordingly, as the host controller(s) 161 idles longer (idle time increases in FIG. 3), the latency values may be software provided (e.g., by a silicon vendor, system developer, a user, etc.) to more flexibly make a tradeoff between energy efficiency and performance.

Figure 4:
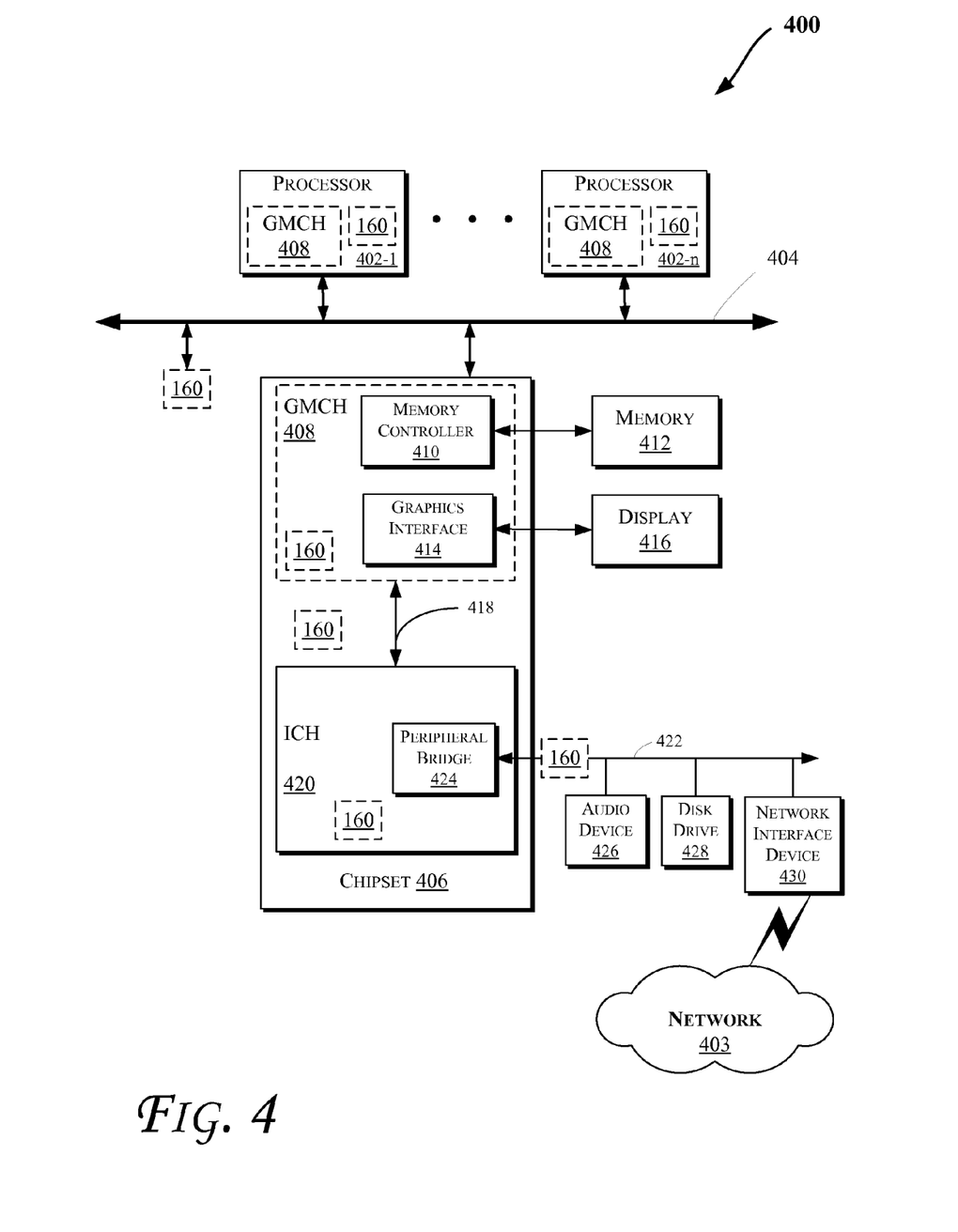

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more components of system 400 may include logic 160 (e.g., as shown in FIG. 4) or other components discussed with reference to FIGS. 1-3. Also, the operations discussed with reference to FIGS. 1-3 may be performed by one or more components of the system 400.

A chipset 406 may also communicate with the interconnection network 404. The chipset 406 may include a Graphics and Memory Control Hub (GMCH) 408. The GMCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 416. In one embodiment, the graphics interface 414 may communicate with the display device 416 via an accelerated graphics port (AGP). In an embodiment, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip and/or a portion or the whole of the GMCH 408 may be included in the processors 402 (instead of inclusion of GMCH 408 in the chipset 406, for example). Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
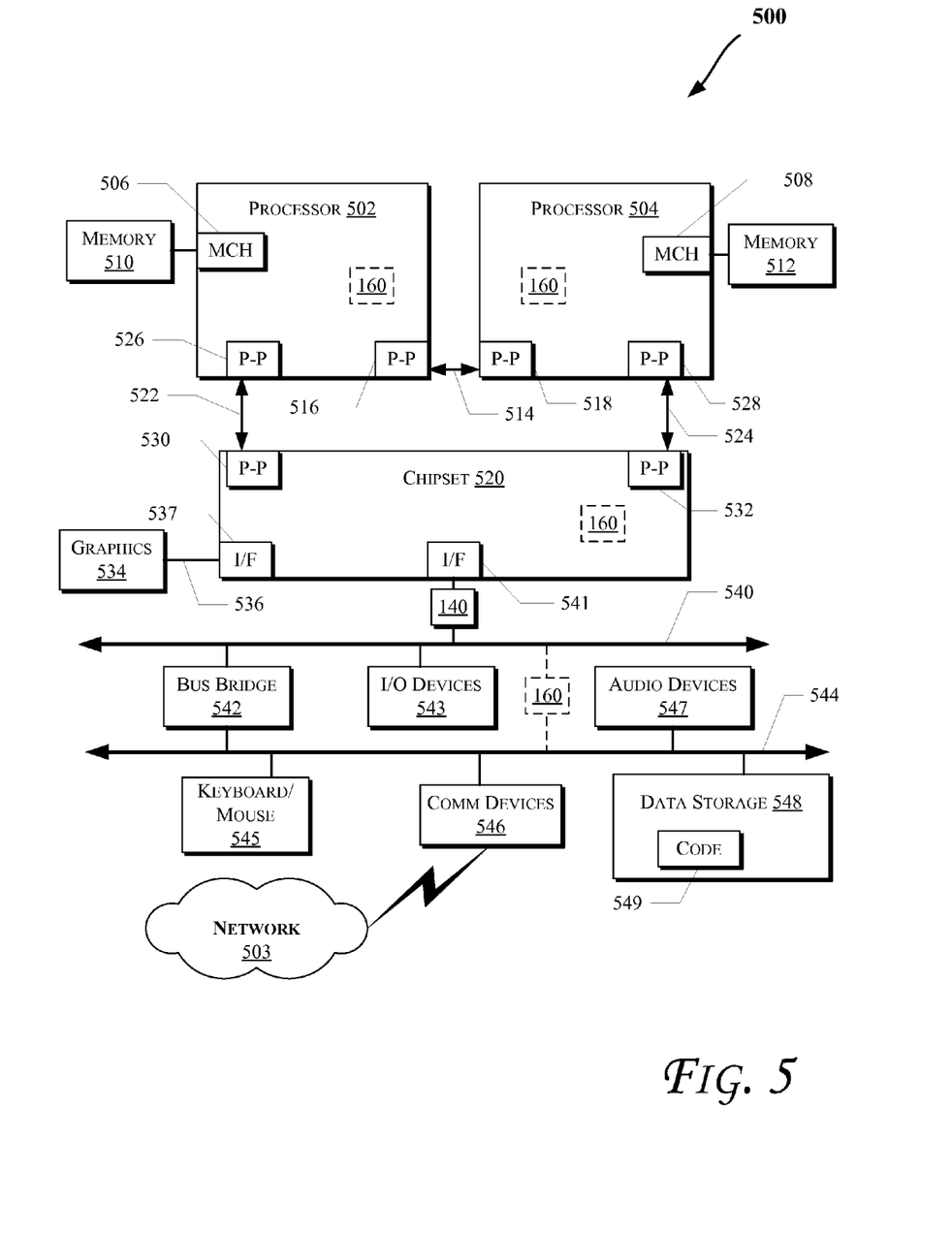

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. For example, one or more components of system 500 may include logic 160 of FIGS. 1-4, including located within the processors 502 and 504. Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
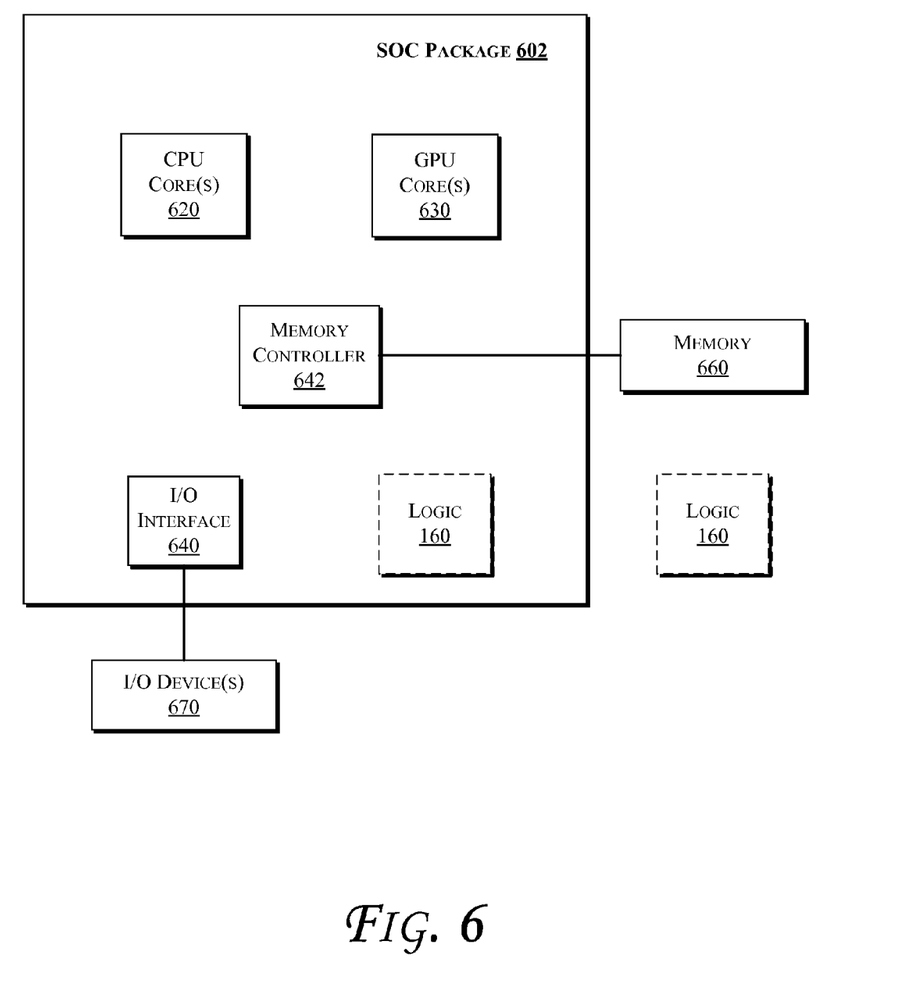

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 160 in an embodiment. Alternatively, the logic 160 may be provided outside of the SOC package 602 (i.e., as a discrete logic).

The following examples pertain to further embodiments. Example 1 includes an apparatus comprising: logic, the logic at least partially comprising hardware logic, to detect latency information, corresponding to one or more devices, from a host controller that is to control access to the one or more devices, wherein the logic is to detect the latency information in response to one or more transactions that are to be initiated by the host controller. Example 2 includes the apparatus of example 1, wherein the logic is to transmit the detected latency information to one or more of: a power management logic, an operating system, a device driver, and a software application. Example 3 includes the apparatus of example 2, wherein at least one of the power management logic, operating system, device driver, and software application is to receive the transmitted latency information and utilize the received information to make a determination between operating at an increased energy efficiency or operating at an increased performance level. Example 4 includes the apparatus of example 1, wherein the latency information is to comprise one or more of: an idle time value of the host controller and a sleep latency value of the host controller. Example 5 includes the apparatus of example 1, wherein the logic is to detect the latency information in response to the one or more transactions that are not to be initiated by the one or more devices. Example 6 includes the apparatus of example 1, wherein the one or more devices are to comprise one or more of: an embedded Multimedia Card (eMMC), a Serial Advanced Technology Attachment (SATA) storage device, and a Universal Flash Storage (UFS) device. Example 7 includes the apparatus of example 1, comprising logic to progressively cycle through latency information to determine a plurality of latency values for as long as the host controllers remains inactive. Example 8 includes the apparatus of example 1, wherein the logic, one or more processor cores, and memory are located on a single integrated circuit die. Example 9 includes a method comprising: detecting latency information, corresponding to one or more devices, from a host controller that is to control access to the one or more devices, wherein the detection of the latency information is performed in response to one or more transactions that are to be initiated by the host controller. Example 10 includes the method of example 9, further comprising transmitting the detected latency information to one or more of: a power management logic, an operating system, a device driver, and a software application. Example 11 includes the method of example 10, further comprising at least one of the power management logic, operating system, device driver, and software application receiving the transmitted latency information and utilizing the received information to make a determination between operating at an increased energy efficiency or operating at an increased performance level.

Example 12 includes a computer-readable medium comprising one or more instructions that when executed on a processor configure the processor to perform one or more operations to: detect latency information, corresponding to one or more devices, from a host controller that is to control access to the one or more devices, wherein the detection of the latency information is performed in response to one or more transactions that are to be initiated by the host controller. Example 13 includes the computer-readable medium of example 12, further comprising one or more instructions that when executed on the processor configure the processor to perform one or more operations to cause transmission of the detected latency information to one or more of: a power management logic, an operating system, a device driver, and a software application. Example 14 includes the computer-readable medium of example 13, further comprising one or more instructions that when executed on the processor configure the processor to perform one or more operations to cause at least one of the power management logic, operating system, device driver, and software application to receive the transmitted latency information and to utilize the received information to make a determination between operating at an increased energy efficiency or operating at an increased performance level. Example 15 includes the computer-readable medium of example 12, wherein the latency information is to comprise one or more of: an idle time value of the host controller and a sleep latency value of the host controller. Example 16 includes the computer-readable medium of example 12, further comprising one or more instructions that when executed on the processor configure the processor to perform one or more operations to cause detection of the latency information in response to the one or more transactions that are not to be initiated by the one or more devices. Example 17 includes the computer-readable medium of example 12, wherein the one or more devices are to comprise one or more of: an embedded Multimedia Card (eMMC), a SATA storage device, and a Universal Flash Storage (UFS) device.

Example 18 includes a system comprising: a processor comprising logic, the logic at least partially comprising hardware logic, wherein the logic is to detect latency information, corresponding to one or more devices, from a host controller that is to control access to the one or more devices, wherein the logic is to detect the latency information in response to one or more transactions that are to be initiated by the host controller. Example 19 includes the system of example 18, wherein the logic is to transmit the detected latency information to one or more of: a power management logic, an operating system, a device driver, and a software application. Example 20 includes the system of example 19, wherein at least one of the power management logic, operating system, device driver, and software application is to receive the transmitted latency information and utilize the received information to make a determination between operating at an increased energy efficiency or operating at an increased performance level. Example 21 includes the system of example 18, wherein the latency information is to comprise one or more of: an idle time value of the host controller and a sleep latency value of the host controller. Example 22 includes the system of example 18, wherein the logic is to detect the latency information in response to the one or more transactions that are not to be initiated by the one or more devices. Example 23 includes the system of example 18, wherein the one or more devices are to comprise one or more of: an embedded Multimedia Card (eMMC), a SATA storage device, and a Universal Flash Storage (UFS) device. Example 24 includes the system of example 18, wherein the logic, one or more processor cores, and memory are located on a single integrated circuit die. Example 25 includes the system of example 18, comprising logic to progressively cycle through latency information to determine a plurality of latency values for as long as the host controllers remains inactive.

Example 26 includes a computer-readable medium comprising one or more instructions that when executed on a processor configure the processor to perform one or more operations of any of examples 9 to 11.

Example 27 includes an apparatus comprising: means for detecting latency information, corresponding to one or more devices, from a host controller that is to control access to the one or more devices, wherein the detection of the latency information is performed in response to one or more transactions that are to be initiated by the host controller. Example 28 includes the apparatus of example 27, further comprising one or more instructions that when executed on the processor configure the processor to perform one or more operations to cause transmission of the detected latency information to one or more of: a power management logic, an operating system, a device driver, and a software application. Example 29 includes the apparatus of example 28, further comprising means for causing at least one of the power management logic, operating system, device driver, and software application to receive the transmitted latency information and to utilize the received information to make a determination between operating at an increased energy efficiency or operating at an increased performance level. Example 30 includes the apparatus of example 27, wherein the latency information is to comprise one or more of: an idle time value of the host controller and a sleep latency value of the host controller. Example 31 includes the apparatus of example 27, further comprising means for causing detection of the latency information in response to the one or more transactions that are not to be initiated by the one or more devices. Example The apparatus of example 27, wherein the one or more devices are to comprise one or more of: an embedded Multimedia Card (eMMC), a SATA storage device, and a Universal Flash Storage (UFS) device.

In various embodiments, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
  logic, the logic at least partially comprising hardware logic, to detect latency information, corresponding to one or more devices, from a host controller that is to control access to the one or more devices,
  wherein the logic is to detect the latency information in response to one or more latency information reports that are to be initiated by the host controller, wherein the latency information is to be determined based at least in part on an amount of delay the host controller may tolerate from when it requests to move data or messages until the host controller is granted the request to move data or messages.

2. The apparatus of claim 1, wherein the logic is to transmit the detected latency information to one or more of: a power management logic, an operating system, a device driver, and a software application.

3. The apparatus of claim 2, wherein at least one of the power management logic, operating system, device driver, and software application is to receive the transmitted latency information and utilize the received information to make a determination between operating at an increased energy efficiency or operating at an increased performance level.

4. The apparatus of claim 1, wherein the latency information is to comprise an idle time value of the host controller.

5. The apparatus of claim 1, wherein the logic is to detect the latency information in response to the one or more latency information reports that are not to be initiated by the one or more devices.

6. The apparatus of claim 1, wherein the one or more devices are to comprise one or more of: an embedded Multimedia Card (eMMC), a Serial Advanced Technology Attachment (SATA) storage device, and a Universal Flash Storage (UFS) device.

7. The apparatus of claim 1, comprising logic to progressively cycle through latency information to determine a plurality of latency values for as long as the host controllers remains inactive.

8. The apparatus of claim 1, wherein the logic, one or more processor cores, and memory are located on a single integrated circuit die.

9. The apparatus of claim 1, comprising logic to progressively cycle through a plurality of latency values, corresponding to the host controller residency in an idle state, to determine a plurality of latency values for as long as the host controllers remains inactive or idle.

10. A method comprising:
   detecting latency information, corresponding to one or more devices, from a host controller that is to control access to the one or more devices,
   wherein the detection of the latency information is performed in response to one or more latency information reports that are to be initiated by the host controller, wherein the latency information is determined based at least in part on an amount of delay the host controller may tolerate from when it requests to move data or messages until the host controller is granted the request to move data or messages.

11. The method of claim 10, further comprising transmitting the detected latency information to one or more of: a power management logic, an operating system, a device driver, and a software application.

12. The method of claim 11, further comprising at least one of the power management logic, operating system, device driver, and software application receiving the transmitted latency information and utilizing the received information to make a determination between operating at an increased energy efficiency or operating at an increased performance level.

13. A non-transitory computer-readable medium comprising one or more instructions that when executed on a processor configure the processor to perform one or more operations to:
   detect latency information, corresponding to one or more devices, from a host controller that is to control access to the one or more devices,
   wherein the detection of the latency information is performed in response to one or more latency information reports that are to be initiated by the host controller wherein the latency information is to be determined based at least in part on an amount of delay the host controller may tolerate from when it requests to move data or messages until the host controller is granted the request to move data or messages.

14. The non-transitory computer-readable medium of claim 13, further comprising one or more instructions that when executed on the processor configure the processor to perform one or more operations to cause transmission of the detected latency information to one or more of: a power management logic, an operating system, a device driver, and a software application.

15. The non-transitory computer-readable medium of claim 14, further comprising one or more instructions that when executed on the processor configure the processor to perform one or more operations to cause at least one of the power management logic, operating system, device driver, and software application to receive the transmitted latency information and to utilize the received information to make a determination between operating at an increased energy efficiency or operating at an increased performance level.

16. The non-transitory computer-readable medium of claim 13, wherein the latency information is to comprise an idle time value of the host controller.

17. The non-transitory computer-readable medium of claim 13, further comprising one or more instructions that when executed on the processor configure the processor to perform one or more operations to cause detection of the latency information in response to the one or more latency information reports that are not to be initiated by the one or more devices.

18. The non-transitory computer-readable medium of claim 13, wherein the one or more devices are to comprise one or more of: an embedded Multimedia Card (eMMC), a SATA storage device, and a Universal Flash Storage (UFS) device.

19. A system comprising:
   a processor comprising logic, the logic at least partially comprising hardware logic, wherein the logic is to detect latency information, corresponding to one or more devices, from a host controller that is to control access to the one or more devices,
   wherein the logic is to detect the latency information in response to one or more latency information reports that are to be initiated by the host controller, wherein the latency information is determined based at least in part on an amount of delay the host controller may tolerate from when it requests to move data or messages until the host controller is granted the request to move data or messages.

20. The system of claim 19, wherein the logic is to transmit the detected latency information to one or more of: a power management logic, an operating system, a device driver, and a software application.

21. The system of claim 20, wherein at least one of the power management logic, operating system, device driver, and software application is to receive the transmitted latency information and utilize the received information to make a determination between operating at an increased energy efficiency or operating at an increased performance level.

22. The system of claim 19, wherein the latency information is to comprise an idle time value of the host controller.

23. The system of claim 19, wherein the logic is to detect the latency information in response to the one or more latency information reports that are not to be initiated by the one or more devices.

24. The system of claim 19, wherein the one or more devices are to comprise one or more of: an embedded Multimedia Card (eMMC), a SATA storage device, and a Universal Flash Storage (UFS) device.

25. The system of claim 19, wherein the logic, one or more processor cores, and memory are located on a single integrated circuit die.

26. The system of claim 19, comprising logic to progressively cycle through latency information to determine a plurality of latency values for as long as the host controllers remains inactive.

* * * * *